(12) United States Patent
Bennion

(10) Patent No.: US 7,153,060 B1
(45) Date of Patent: Dec. 26, 2006

(54) SYSTEMS AND METHODS FOR ENVIRONMENTAL STABILIZATION OF A BODY OF WATER

(76) Inventor: Robert F. Bennion, 3062 W. Laytham Way, West Jordan, UT (US) 84088

( * ) Notice: Subject to any disclaimer, the term of this patent is extended or adjusted under 35 U.S.C. 154(b) by 0 days.

(21) Appl. No.: 11/251,713

(22) Filed: Oct. 17, 2005

(51) Int. Cl.
*E02B 9/00* (2006.01)
(52) U.S. Cl. .......................................... 405/75; 405/80
(58) Field of Classification Search ................ 405/75, 405/76, 302.6, 15, 80
See application file for complete search history.

(56) References Cited

U.S. PATENT DOCUMENTS

| | | | | |
|---|---|---|---|---|
| 4,010,614 A | * | 3/1977 | Arthur | 60/641.15 |
| 4,284,900 A | * | 8/1981 | Botts | 290/43 |
| 4,307,299 A | * | 12/1981 | Norton | 290/52 |
| 5,829,917 A | * | 11/1998 | Maudal | 405/52 |
| 6,575,662 B1 | * | 6/2003 | French | 405/80 |
| 6,612,778 B1 | * | 9/2003 | Jackson | 405/49 |
| 6,948,886 B1 | * | 9/2005 | Jackson | 405/302.6 |
| 2005/0034452 A1 | * | 2/2005 | Davis | 60/398 |

* cited by examiner

*Primary Examiner*—Frederick L. Lagman
(74) *Attorney, Agent, or Firm*—Utah Valley Patent Services; Steve McDaniel

(57) ABSTRACT

A system and method are disclosed for environmental stabilization of a body of water. A body of water is stabilized by extracting water from a higher elevation body of water at a downhill flow rate, receiving the water at lower elevation body of water, and extracting water from the lower elevation body of water to a higher elevation body of water or the like at an uphill flow rate. In certain embodiments, the invention may also include extracting energy from the downhill flow rate and using at least a portion of the energy to generate an uphill flow rate. The system and method may also include temporarily adjusting the downhill and uphill flow rates in preparation for a high demand interval.

25 Claims, 4 Drawing Sheets

SYSTEMS AND METHODS FOR ENVIRONMENTAL STABILIZATION OF A BODY OF WATER

BACKGROUND OF THE INVENTION

1. Field of the Invention

This invention relates to methods and systems for transporting water and more particularly relates to methods and systems for environmental stabilization of a body of water.

2. Description of the Related Art

Bodies of water such as lakes and seas are often vital components of an environment and ecosystem. In addition to promoting a temperate climate, bodies of water often share an intricate relationship with local plant and animal life. Indeed, bodies of water provide plants and animals a home, breeding ground, water source, and more.

The impact a body of water has on an environment and surrounding ecosystem often depends upon the characteristics of the body of water, such as the water level, salinity, water quality, evaporation rate, temperature and the like. Typically, if the water's characteristics change, dependent plant and animal life must change as well. Where local plants and animals are unable to adapt to the changing characteristics of a body of water, the local environment and ecosystem may be jeopardized.

For example, if an inland sea lacks an outlet, the sea may become increasingly salty over time due to evaporation. As a result, the salinity of the water may harm local vegetation and force animals to seek another water source. On the other hand, if a body of water lacks stable inflow from tributaries, the body of water may experience dramatically varying water levels and extreme temperature changes. Again, the vitality of dependant plant and animal life may be threatened by the water level and temperature changes, resulting in dwindling populations, forced migrations, or extinction. In short, the stability of a body of water greatly impacts the surrounding environment. In particular, a body of water that experiences extreme changes typically cannot sustain a balanced ecosystem or environment.

One example of the consequences of not stabilizing a body of water is the Aral Sea in central Asia. The destruction of the Aral Sea ecosystem has been sudden and severe. Beginning in the 1960s, agricultural demands deprived the Aral Sea of much need fresh water. In the past few decades, the Aral Sea's volume has decreased by 75 percent, the equivalent of draining Lakes Erie and Ontario. The shoreline has receded up to 120 km from its former shore leaving a perimeter of polluted sediments around the sea.

Uzbekistan, Kazakhstan, and other Central Asian states continue to use water to grow cotton and other export crops despite the water and soil contamination, dangerous levels of polluted airborne sediments, and closure of fisheries. Local birth defect rates are currently above 5 percent. Although it is generally agreed that the current situation is unsustainable, the poverty and export dependency of the Central Asian states have prevented real action, and the sea continues to shrink.

Another specific example of a potentially unstable body of water is the Salton Sea in California. The Salton Sea is California's largest inland body of water and a tremendous source of biodiversity. Fifty percent of all bird species found in the United States can be found at the Salton Sea, many of which are dependent upon the fish found therein. While the Sea experiences over six feet of evaporation each year, the water level is currently being replenished by the irrigation run-off from five hundred thousand acres of adjoining farmland. Notably, this farmland is estimated to produce eighty-five percent of the nation's winter vegetable crop.

Unfortunately, the farmland's agricultural run-off contains tremendous amounts of salt, fertilizers, and other chemicals that end up in the Salton Sea. Since its inception in 1905, the Sea has become twenty-five percent saltier than the ocean, in addition to its ever changing chemical composition. Naturally, there is a great concern that the Sea will eventually become unable to support the tremendous plant and animal life dependent thereon.

Despite the apparent need for a solution to the Salton Sea problem, no viable solutions currently exist. Continuing irrigation will inevitably increase the salinity and foreign chemical composition of the Sea, resulting in an unavoidable death sentence to dependent plant and animal life. Discontinuing the irrigation of the adjoining farmland would eliminate an agricultural resource that provides eight-five percent of the nation's winter vegetable crop.

Allowing the Sea to simply evaporate would result in toxic dust storms, as the strong Coachella Valley winds would inevitably scatter the dried, chemical-laden sea bed throughout the adjoining communities. Diverting water from the Colorado River to replenish the Sea would deprive the adjoining farmland of irrigation or nearby cities, such as San Diego and Los Angeles, of a much needed water source.

From the foregoing discussion, it should be apparent that a need exists for a system and method that environmentally stabilizes a body of water. Beneficially, such a system and method would promote the welfare of the local environment and ecosystem dependant upon the body of water. In addition, the system and method would also effectively provide energy and water conservation mechanisms useful to man without damaging the environment.

SUMMARY OF THE INVENTION

The present invention has been developed in response to the present state of the art, and in particular, in response to the problems and needs in the art that have not yet been fully solved by currently available systems and methods for protecting an environment. Accordingly, the present invention has been developed to provide a system and method for environmentally stabilizing a body of water that overcome many or all of the above-discussed shortcomings in the art.

In one embodiment, the system includes a downhill water conveyance system that conveys water extracted from a higher elevation body of water (or tributary associated therewith) to a lower elevation body of water, an uphill water conveyance system that conveys water extracted from the lower elevation body of water to the higher elevation body of water (or tributary associated therewith), and a control module that controls the water flow rate of the downhill and uphill water conveyance systems. By controlling the uphill and downhill flow rates, the lower elevation and/or higher elevation body of water may be environmentally stabilized. In certain embodiments, the conveyance systems are pipelines.

In some embodiments, the system also includes a generator that generates power from the water extracted from a higher elevation body of water (or tributary associated therewith) and a pump configured to provide uphill water flow. Utilizing a generator and pump creates an energy efficient and environmentally friendly system, inasmuch as the generated power may be used to drive the pump. In one embodiment, the control module is configured to temporarily reduce the downhill water flow rate and/or increase the uphill water flow rate in preparation for a high demand interval.

In certain embodiments, the downhill water conveyance system receives water from a higher elevation water source, such as a river, and the uphill water conveyance system delivers water to a selected destination having a substantially similar elevation as the higher elevation water source. The system may include a secondary water system that delivers water received at the lower or higher elevation to multiple users, particularly in regions where water availability may be scarce or unpredictable, for purposes such as providing sewage water, filling pools, and the like. The water delivered by the secondary water system may be saltwater.

While the simultaneous use of both an uphill and a downhill water conveyance system may at first glance appear to be unnecessary, the use of two essentially unidirectional systems eliminates the requirement for reversing flow in a conveyance system. Reversing the flow of a conveyance system is extremely inefficient and may render a system inoperable for considerable lengths of time. In addition, simultaneous uphill and downhill flow increases the ability to stabilize the lower elevation and/or the higher elevation body of water.

In another aspect of the present invention, a method for environmental stabilization of a body of water includes extracting water from a higher elevation body of water (or tributary associated therewith) at a downhill flow rate, receiving the water at a lower elevation body of water, providing water extracted from the lower elevation body of water to the higher elevation body of water (or tributary associated therewith) at an uphill flow rate, thereby environmentally stabilizing the lower elevation and/or higher elevation body of water. In varying embodiments, "environmentally stabilizing" may include stabilizing the water level, water quality, water salinity, or some other characteristic of the body of water.

In one embodiment, the method includes extracting energy in conjunction with receiving the water at the lower elevation body of water. In another embodiment, the method includes temporarily reducing the downhill flow rate or temporarily increasing the uphill flow rate in preparation for a high demand interval. Having the capacity to control the downhill and uphill flow rates enables the system to adapt to the changing energy demands and environmental factors.

In another embodiment, the method includes extracting water from a higher elevation water source at a downhill flow rate, receiving the water at a body of water having a lower elevation, generating power from energy available from the extracted water, using a portion of the energy available from the extracted water to convey water at an uphill flow rate from the body of water having a lower elevation to a selected destination having a substantially similar elevation as the higher elevation water source. The water conveyed from the higher elevation water source or the lower elevation body of water may be saltwater. The method may also include conveying water such as the saltwater to a plurality of users via a secondary water system.

The present invention provides distinct advantages over the prior art. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Furthermore, the described features, structures, or characteristics of the invention may be combined in any suitable manner in one or more embodiments.

Figure 1:
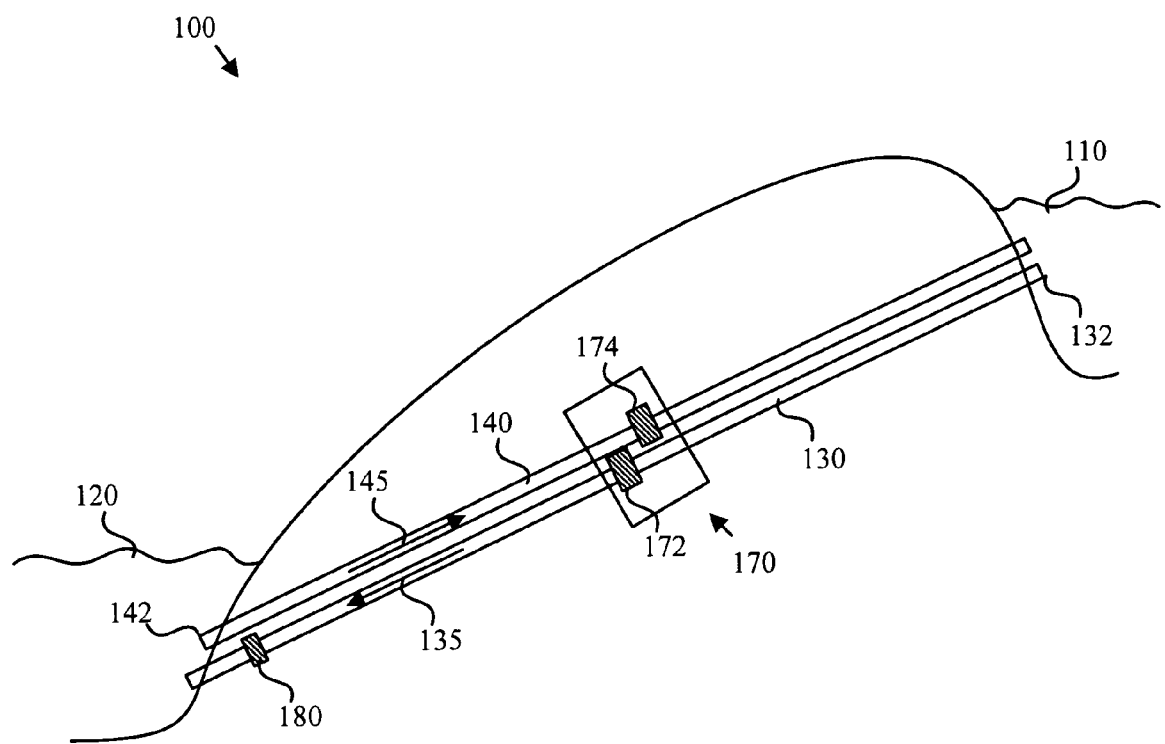
FIG. 1 is a schematic illustration of one embodiment of an environmental stabilization system in accordance with the present invention.

FIG. 1 is a schematic illustration of one embodiment of an environmental stabilization system 100. The depicted environmental stabilization system 100 includes a higher elevation body of water 110, a lower elevation body of water 120, a downhill water conveyance system 130 operating at a downhill flow rate 135, an uphill water conveyance system 140 operating at an uphill flow rate 145, a control module 170, and a generator 180. In some embodiments, the lower elevation body of water 120 is subterranean. Environmental stabilization may include stabilizing the water level, water quality, water salinity or the like of the higher elevation body of water 110 and/or the lower elevation of water 120.

The downhill water conveyance system 130 and uphill water conveyance system 140 may comprise any combination of water transport means such as pipelines, canals, or the like. The use of two unidirectional systems eliminates the need for reversing flow in a conveyance system. Reversing the flow of a conveyance system may be undesirable because of the excessive time and energy required to drain the system of one flow and begin another flow in the opposite direction. Additionally, two unidirectional systems facilitate environmental stabilization by providing a simultaneous and continuous flow of water in both directions.

In certain embodiments, the generator 180 may generate power from the water extracted from the higher elevation body of water or tributary associated therewith. In some embodiments, the generator 180 is substantially non-polluting because the energy source is derived from the potential energy of the downhill flow rate 135. Additionally, using a generator 180 in this manner promotes an energy efficient system 100 as the power made available by the generator 180 may be used by a control module 170 and pump 174 (as will be discussed below) to convey water to the higher elevation body of water 110 or tributary associated therewith.

In certain embodiments, the control module 170 facilitates environmental stabilization by adjusting the downhill flow rate 135 and the uphill flow rate 145. In the depicted embodiment, the control module 170 may control the downhill flow rate 135 via a gate 172 and the uphill flow rate 145 via a pump 174. In one embodiment, the control module 170 controls a mechanical work exchanger that wholly or partially provides the energy necessary to provide the uphill flow rate 145.

Over time, factors such as evaporation may require an imbalance in the long-term average of the downhill flow rate 135 and the uphill flow rate 145. In one embodiment, the lower elevation body of water 120 is an inland sea with few tributaries that experiences high rates of evaporation resulting in an average downhill flow rate 135 that is significantly greater than the average uphill flow rate 145. Under such a scenario or similar scenarios, the present invention may provide more energy than is consumed, thus providing a non-polluting source of energy in addition to environmental stabilization.

In other embodiments, the average uphill flow rate 145 may be greater than or substantially the same as the downhill flow rate 135 resulting in a net consumption of energy. However, regardless of whether the long-term average flow rates result in a net consumption or production of energy, increased energy may be provided during high demand intervals by reducing the downhill flow rate 135 during low-demand intervals and/or increasing the uphill flow rate 145 during such intervals. Accordingly, the control module 170 may be configured to temporarily reduce the downhill flow rate 135 and/or increase the uphill flow rate 145 in anticipation of a high demand interval.

Another factor that may cause an imbalance in the long-term average of the downhill flow rate 135 and the uphill flow rate 145 is water temperature and density. In certain embodiments, the water extraction point 132 of the downhill water conveyance system 130 and the water extraction point 142 of the uphill water conveyance system 140 may be positioned at an elevation such that the downhill flowing water is cooler and denser than the uphill flowing water. Such an embodiment provides for a more energy efficient system as the average energy extracted from the downhill flow rate 135 may be greater than the average energy required to provide the uphill flow rate 145.

Thus, depending upon the embodiment, the system 100 may utilize an uphill and downhill conveyance system, water evaporation, and water density, to not only environmentally stabilize the lower elevation body of water 120, but do so while producing energy in an environmentally friendly manner.

Figure 2:
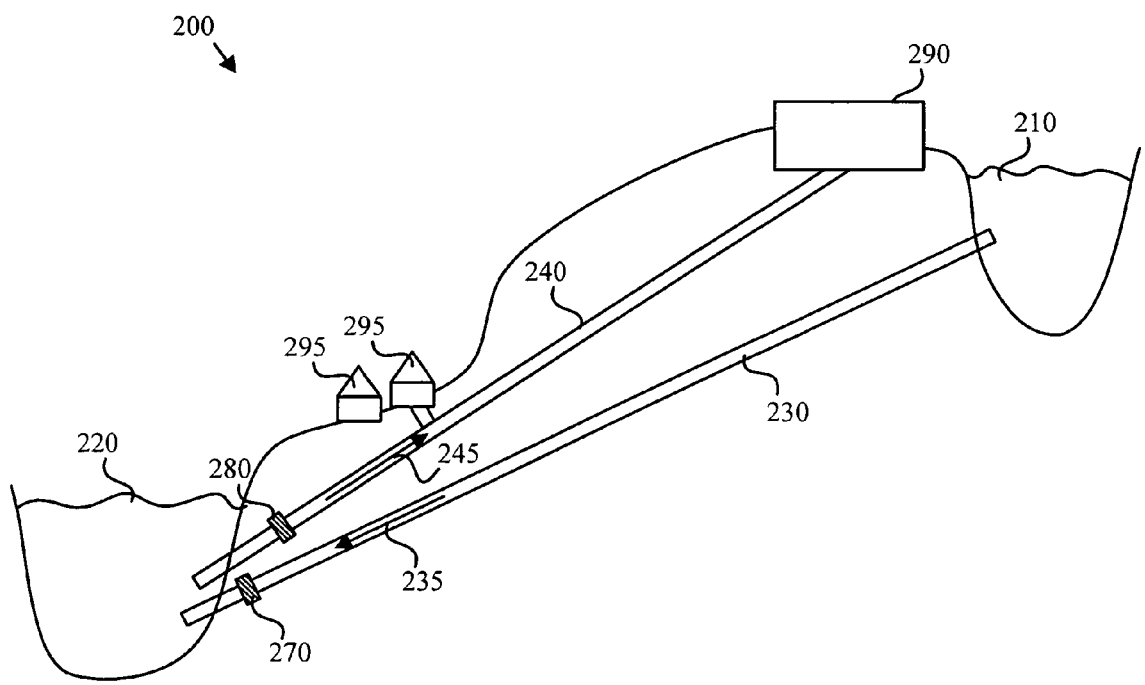
FIG. 2 is a schematic illustration of another embodiment of an environmental stabilization system in accordance with the present invention.

FIG. 2 is a schematic illustration of another embodiment of an environmental stabilization system 200. As depicted, the environmental stabilization system 200 includes a higher elevation body of water 210, a lower elevation body of water 220, a downhill water convenience system 230 operating at a downhill flow rate 235, an uphill water conveyance system 240 operating at an uphill flow rate 245, a generator 270, a pump 280, and a selected destination 290. In some embodiments, the lower elevation body of water 210 is subterranean. The elements of the system 200 function cooperatively to environmentally stabilize the body of water 210 or 220, provide water to a selected destination 290, and deliver water to a plurality of users 295. In some embodiments, the water provided to a plurality of users 295 is saltwater.

In certain embodiments, the downhill water conveyance system 230 is configured to convey water extracted from the higher elevation water source 210 to the body of water 220 having a lower elevation. The generator 270 may be configured to generate power from energy available from the extracted water. The pump 280 may be configured to remove water from the body of water 220 at an uphill flow rate 235 to a selected destination 290 having a substantially similar elevation as the higher elevation water source 210. The pump 280 may comprise a work exchanger or the like. In certain embodiments, some of the energy made available by the generator 270 may be used by the pump, thereby promoting an energy efficient system with little or no pollution.

In certain embodiments the selected destination 290 may include a desalinization plant, public water storage, sewage system, pump storage, water depository, or the like. In embodiments with a secondary water system 292, the system 200 may be configured to deliver water to a plurality of users 295 proximate to the body of water 220 or the selected destination 290. In such embodiments, the system 200 simultaneously environmentally stabilizes the body of water 220 and/or 210 and provides users with a source of water that may be used to fulfill various needs such as filling swimming pools, flushing toilets, cleaning roads and public areas, running sewer systems, and the like.

In one embodiment, the users 295 are proximate to the upper body of water 210 and the water provided to the users 295 is saltwater. The users 295 and/or the selected destination 290 may be provided with desalinization equipment reducing or eliminating the need for a fresh water source. The upper body of water may also provide recreation opportunities such as boating or snorkeling for the users 295 as well as others. For example, currently inhospitable desert locations near California's coastline may be rendered hospitable by providing a natural or man-made body of water at a higher elevation and conveying water from the Pacific Ocean to the higher elevation body of water and/or the selected destination 290. Therefore, the system 200 may serve to moderate the local environment while providing a recreational destination and a usable source of water for the users 295.

Figure 3:
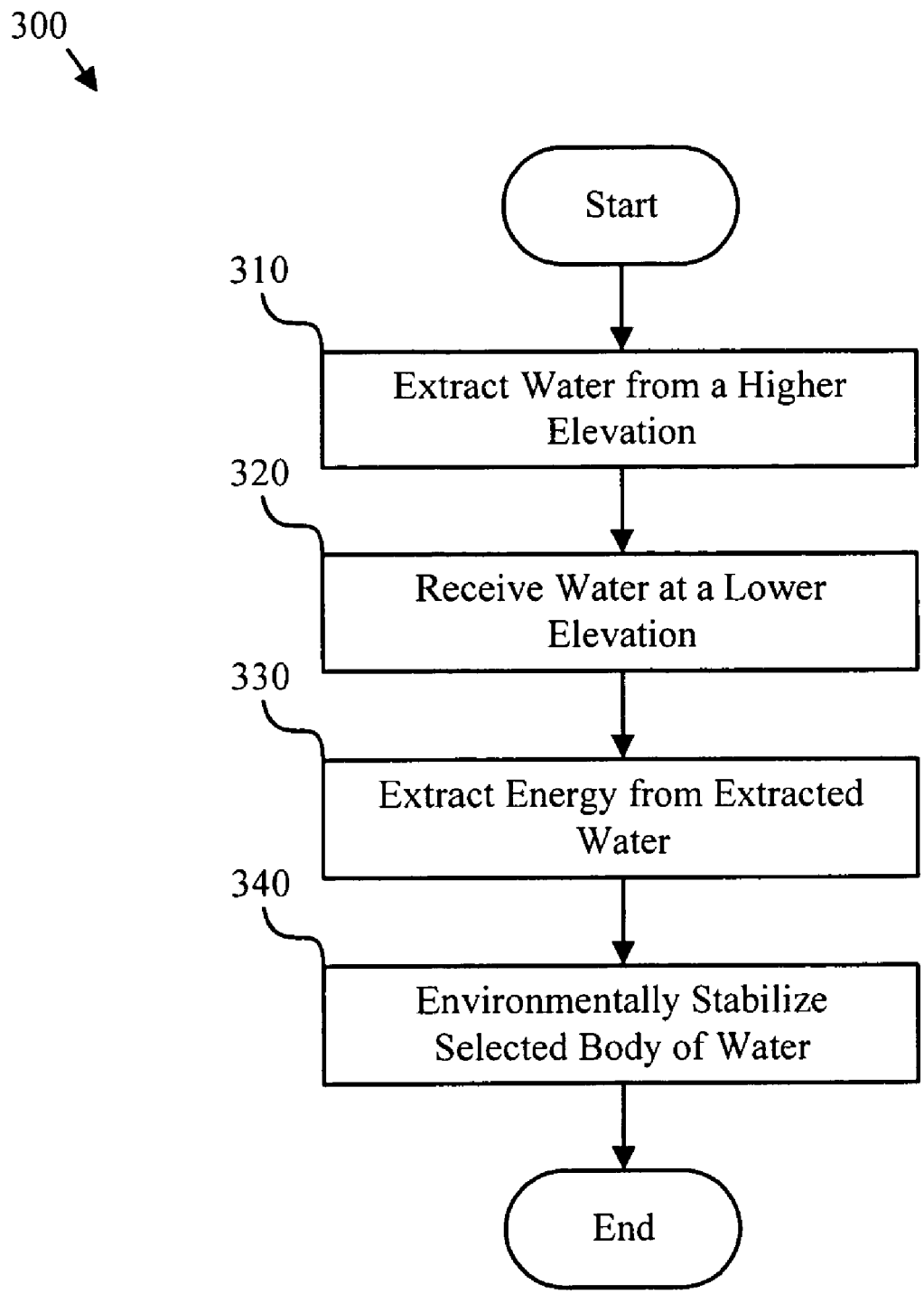
FIG. 3 is a process flow chart diagram of one embodiment of a method for environmentally stabilizing a body of water in accordance with the present invention.

FIG. 3 is a process flow chart diagram of one embodiment of a method 300 for environmentally stabilizing a body of water. The depicted method 300 includes extracting 310 water from a higher elevation body of water or tributary associated therewith at a downhill flow rate, receiving 320 the water at a lower elevation body of water, extracting 330 energy in conjunction with receiving the water at the lower elevation body of water, and environmentally stabilizing 340 the lower elevation body of water by providing water extracted from the lower elevation body of water to the higher elevation body of water or tributary associated therewith at an uphill flow rate.

The method 300 may also include temporarily adjusting the downhill flow rate 135 or the uphill flow rate 145 in preparation for a high demand interval. In certain embodiments, the adjustment of the downhill flow rate 135 and the uphill flow rate 145 may include losses due to evaporation, such as the evaporation rate of the lower elevation body of water 120. The difference in the energy extractable from the downhill flow rate 135 and consumed in providing the uphill flow rate 145 may also represent differences in density due to water temperature. The extraction and reception points of the higher elevation body of water 110 and lower elevation body of water 120 may vary depending upon the target temperatures of the water in the downhill flow rate 135 and uphill flow rate 145.

Extracting 310 water from a higher elevation body of water 110 or tributary may include extracting water from a sea, ocean, or other body of water using a pipeline, canal, or the like. Receiving 320 the water at a lower elevation body of water 120 may include providing a pipeline connecting the higher elevation body of water 110 and the lower elevation body of water 110, as seen in FIG. 1. In certain embodiments, the lower elevation body of water 110 is a dead sea, such as the Salton Sea. Introducing water into the lower elevation body of water 120 may facilitate environmentally stabilizing the body of water 120.

Extracting 330 energy in conjunction with receiving the water at a lower elevation body of water 120 may include providing a generator 180 configured to produce electricity from the potential energy of the downhill flow rate 135. The energy extracted from the downhill flow rate 135 may be wholly or partially used to provide an uphill flow rate 145. Depending on the embodiment, the net gain in energy may be proportional to a difference in the downhill flow rate 135 and uphill flow rate 145. As mentioned previously, extracting 330 energy may include utilizing principles such as evaporation, water density, and gravity to provide energy in a non-polluting manner.

Environmentally stabilizing 340 may include stabilizing a water level, water quality, salinity level, or similar characteristic of the lower elevation body of water 120. In one embodiment, the lower elevation body of water is the Salton Sea. Environmentally stabilizing the Salton Sea may include stabilizing the Salton Sea's water salinity and level by extracting water from the ocean, introducing the ocean water into the Salton Sea, and removing the undesirably salty water from the Salton Sea, thereby simultaneously ensuring that the Salton Sea retains its original water level and reflects the salinity of ocean water.

Figure 4:
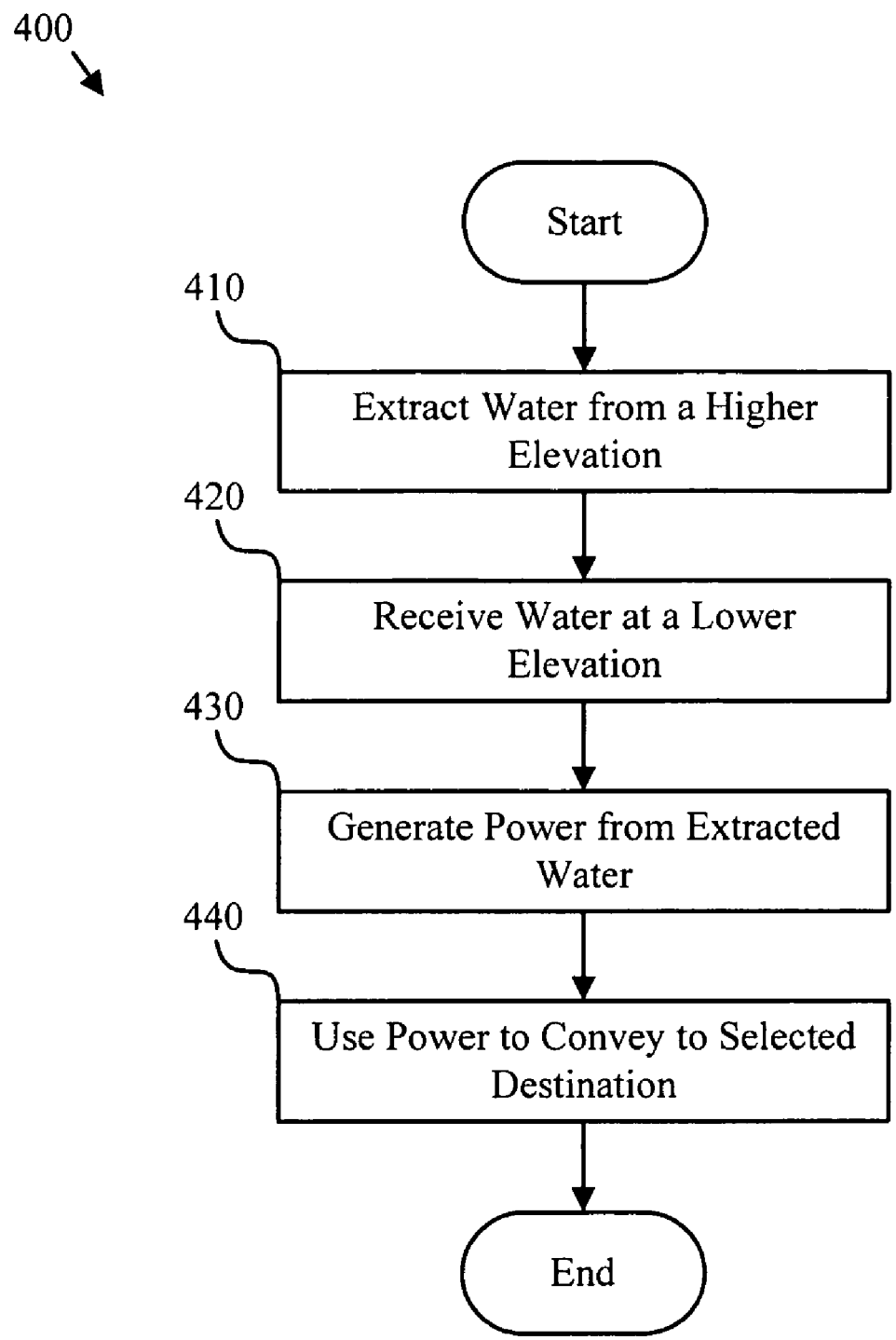
FIG. 4 is a process flow chart diagram of another embodiment of a method for environmentally stabilizing a body of water in accordance with the present invention.

FIG. 4 is a process flow chart diagram of a method 400 for environmentally stabilizing a body of water. The depicted method 400 includes extracting 410 water from a higher elevation water source at a downhill flow rate, receiving 420 the water at a body of water having a lower elevation, generating 430 power from energy available from the extracted water, and using 440 a portion of the energy available from the extracted water to convey water at an uphill flow rate from the body of water having a lower elevation at to a selected destination having a substantially similar elevation as the higher elevation water source. In some embodiments, the water received from the higher elevation water source is saltwater.

Depending upon the embodiment, the selected destination 290 may include a desalinization plant, public water storage, water depository, reservoir or the like. The method 400 may further include conveying water received from either the higher elevation water source 210 or the lower elevation body of water to a plurality of users 295 proximate to the body of water having a lower elevation. As mentioned above, the water conveyed to the plurality of users 295 may be saltwater used to flush toilets, clean public areas, run sewer systems, and the like. Providing such water to a plurality of users 295 may provide an energy-efficient and environmentally friendly way for society to benefit from a water source that was previously unused.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for environmental stabilization of a body of water, the method comprising:

extracting water from a higher elevation body of water or tributary associated therewith at a downhill flow rate;

receiving the water at a lower elevation body of water;

simultaneously providing water extracted from the lower elevation body of water to the higher elevation body of water or tributary associated therewith at an uphill flow rate; and controlling the uphill and downhill flow rates to stabilize at least one environmental characteristic of the higher or lower elevation body of water.

2. The method of claim 1, further comprising extracting energy in conjunction with receiving the water at the lower elevation body of water.

3. The method of claim 2, wherein extracting energy comprises generating power.

4. The method of claim 2, further comprising temporarily reducing the downhill flow rate in preparation for a high demand interval.

5. The method of claim 2, further comprising temporarily increasing the uphill flow rate in preparation for a high demand interval.

6. The method of claim 2, wherein a net gain in energy is proportional to a difference in the downhill and uphill flow rates.

7. The method of claim 6, wherein the difference in the downhill and uphill flow rates includes losses due to evaporation.

8. The method of claim 6, wherein the difference in the downhill and uphill flow rates includes differences in density.

9. The method of claim 1, wherein the higher elevation body of water is a sea or ocean.

10. The method of claim 1, wherein the lower elevation body of water is a dead sea.

11. The method of claim 1, wherein controlling the uphill and downhill flow rates stabilizes a water level of the higher or lower elevation body of water.

12. The method of claim 1, wherein controlling the uphill and downhill flow rates stabilize a water quality of the higher or lower elevation body of water.

13. The method of claim 1, wherein controlling the uphill and downhill flow rates stabilize a salinity level of the higher or lower elevation body of water.

14. A system for environmental stabilization of a body of water, the system comprising:
    a downhill water conveyance system configured to convey water extracted from a higher elevation body of water or tributary associated therewith to a lower elevation body of water;
    a uphill water conveyance system configured to simultaneously convey water extracted from the lower elevation body of water to the higher elevation body of water or tributary associated therewith; and
    a control module configured to control a flow rate of the downhill and uphill water conveyance systems to stabilize at least one environmental characteristic of the lower elevation body of water.

15. The system of claim 14, further comprising a generator configured to generate power from the water extracted from a higher elevation body of water or tributary associated therewith.

16. The system of claim 15, wherein the control module is further configured to temporarily reduce the downhill flow rate below the uphill flow rate in preparation for a high demand interval.

17. The system of claim 15, further comprising a control module configured to temporarily increase the uphill flow rate above the downhill flow rate in preparation for a high demand interval.

18. The system of claim 14, wherein the downhill water conveyance system comprises a pipeline.

19. The system of claim 14, wherein the uphill water conveyance system comprises a pipeline.

20. A method for environmental stabilization of a body of water, the method comprising:
    extracting water from a higher elevation water source at a downhill flow rate;
    receiving the water at a body of water having a lower elevation;
    generating power from energy available from the extracted water; and
    using a portion of the energy available from the extracted water to simultaneously convey water at a uphill flow rate from the body of water having a lower elevation at to a selected destination having a substantially similar elevation as the higher elevation water source, thereby stabilizing at least one environmental characteristic of the lower elevation body of water.

21. The method of claim 20, further comprising conveying water received from the higher elevation water source to a plurality of users proximate to the body of water having a lower elevation.

22. The system of claim 20, wherein the water received from the higher elevation water source is saltwater.

23. A system for environmental stabilization of a body of water, the system comprising:
    a downhill water conveyance system configured to convey water extracted from a higher elevation water source to a body of water having a lower elevation at a downhill flow rate;
    a generator configured to generate power from energy available from the extracted water;
    a pump configured to simultaneously remove water from the body of water at a
        uphill flow rate to a selected destination having a substantially similar elevation as the higher elevation water source; and
    a control module configured to control the downhill and uphill flow rates to stabilize at least one environmental characteristic of the lower elevation body of water.

24. The system of claim 23, further comprising a secondary water system configured to deliver water received from the downhill water conveyance system to a plurality of users proximate to the body of water having a lower elevation.

25. The system of claim 23, wherein the water received from the downhill water conveyance system is saltwater.

* * * * *